US008484340B2

(12) United States Patent  
Hogan et al.

(10) Patent No.: US 8,484,340 B2  
(45) Date of Patent: Jul. 9, 2013

(54) SERVER ARRAY CAPACITY MANAGEMENT CALCULATOR

(75) Inventors: Grant Hogan, Redmond, WA (US); Roy Y. Ma, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 477 days.

(21) Appl. No.: 12/815,270

(22) Filed: Jun. 14, 2010

(65) Prior Publication Data

US 2011/0307601 A1 Dec. 15, 2011

(51) Int. Cl.
G06F 15/173 (2006.01)
G06F 15/177 (2006.01)

(52) U.S. Cl.
USPC .......................... 709/224; 709/226; 709/221

(58) Field of Classification Search
USPC ......................................................... 709/224
See application file for complete search history.

(56) References Cited

U.S. PATENT DOCUMENTS

| 5,754,829 | A * | 5/1998 | Motohiro et al. ............. 709/201 |
| 6,377,991 | B1 * | 4/2002 | Smith et al. ................... 709/226 |
| 6,606,658 | B1 | 8/2003 | Uematsu |
| 7,003,560 | B1 | 2/2006 | Mullen et al. |
| 7,213,065 | B2 | 5/2007 | Watt |
| 7,313,620 | B2 | 12/2007 | Odhner et al. |
| 7,610,186 | B2 | 10/2009 | Odhner et al. |
| 8,201,217 | B1 * | 6/2012 | Begen et al. ........................ 726/3 |
| 2005/0256971 | A1 | 11/2005 | Colrain et al. |
| 2007/0283360 | A1 | 12/2007 | Koretz et al. |
| 2008/0030764 | A1 * | 2/2008 | Zhu et al. ...................... 358/1.15 |
| 2008/0071728 | A1 * | 3/2008 | Lim .................................. 707/1 |
| 2009/0092047 | A1 | 4/2009 | Gemelos et al. |
| 2009/0183218 | A1 | 7/2009 | Li et al. |
| 2009/0201293 | A1 * | 8/2009 | Tung et al. ..................... 345/440 |
| 2009/0324029 | A1 * | 12/2009 | Araikum ....................... 382/128 |

OTHER PUBLICATIONS

"Insight Dynamics Capacity Planning", Retrieved at << http://h18000.www1.hp.com/products/solutions/insightdynamics/optimize-capacity.html >>, Retrieved Date: Apr. 20, 2010, p. 1.
McDonald, Raymond., "Finding the Best Capacity Planning Tool for your Data Center", Retrieved at << http://searchdatacenter.techtarget.com/tip/0,289483,sid80_gci1380955,00.html >>, Feb. 8, 2010, pp. 4.

* cited by examiner

Primary Examiner — Richard G Keehn
(74) Attorney, Agent, or Firm — Alleman Hall McCoy Russell & Tuttle LLP

(57) ABSTRACT

Server array capacity calculator systems and methods are provided for estimating capacity based on diagnostic data. For example, a system comprising a database and an estimator computing device comprising a graphical user interface (GUI) and a capacity management module stored in memory and executed on a processor comprising instructions to receive diagnostic data from a plurality of servers of different server types, receive user input via the GUI, and in response to the user input, and for each of the server types, compute a current reference number of servers from current server efficiency estimates and a current number of utilized servers; calculate a growth multiplier from a ratio of the projected number of users and a count of the current concurrent users; generate a projected number of servers by multiplying the current reference number of servers with the growth multiplier, and display the projected number of servers on the GUI.

15 Claims, 5 Drawing Sheets

| Growth Modified TPS/Server | TPS/Server Threshold | Current Avg Max CPU | Growth Modified CPU | CPU Threshold | Max Supportable CU |
|---|---|---|---|---|---|
| 1,863.7 | 2,818.7 | 32.4 | 39.7 | 60.0 | 4,385,922 |
| 21,412.4 | 50,887.9 | 8.6 | 10.5 | 25.0 | 6,892,020 |
| 823.2 | 2,419.6 | 16.7 | 20.4 | 60.0 | 8,523,777 |
| 86.3 | 508.3 | 8.3 | 10.2 | 60.0 | 17,074,095 |
| 246.6 | 1,598.8 | 7.6 | 9.3 | 60.0 | 18,799,720 |
| 32.1 | 210.1 | 7.5 | 9.2 | 60.0 | 18,965,538 |
| 200.7 | 1,475.9 | 6.7 | 8.2 | 60.0 | 21,330,397 |
| 66.9 | 592.4 | 5.5 | 6.8 | 60.0 | 25,673,641 |
| 29.7 | 325.9 | 4.5 | 5.5 | 60.0 | 31,817,852 |

{ 104

| Growth Modified TPS/Server | TPS/Server Threshold | Current Avg Max CPU | Growth Modified CPU | CPU Threshold | Max Supportable CU |
|---|---|---|---|---|---|
| 20.1 | 18.6 | 70.5 | 86.5 | 80.0 | 2,683,271 |
| 64,238.8 | 80,000.0 | 26.2 | 32.1 | 99.0 | 3,200,000 |
| 43.2 | 48.3 | 72.3 | 88.7 | 99.0 | 3,238,234 |
| 787.5 | 884.0 | 43.6 | 53.4 | 60.0 | 3,255,487 |
| 87,704.6 | 120,000.0 | 13.3 | 16.4 | 99.0 | 3,600,000 |
| 256.6 | 325.3 | 38.6 | 47.3 | 60.0 | 3,676,164 |

{ 104

TABLE 1B

FIG. 4

SERVER ARRAY CAPACITY MANAGEMENT CALCULATOR

BACKGROUND

Many web-based applications, such as game portals, search engines, etc., are served to end users from server farms. These server farms include arrays of different types of servers, which are configured to respond to various types of requests from end users. As the number of users for a service grows, the number of servers in the server farm may also grow. One difficulty faced by administrators of such server farms is that it is difficult to estimate how many servers will be needed to satisfy the load of user requests as the user base grows. Deployment of too many servers is expensive and wasteful, while deployment of too few servers can result in performance problems, and dissatisfied users, particularly during times of peak demand.

SUMMARY

Server array capacity management calculator systems and methods are provided. For example, a system is provided for estimating server array capacity based on observed diagnostic data comprising a database and an estimator computing device. The estimator computing device may comprise a graphical user interface and a capacity management module executed by a processor using portions of memory and comprising instructions to receive diagnostic data from a plurality of servers of different server types, and receive user input via the graphical user interface. The capacity management module may be configured to, in response to the user input, and for each of the server types, compute a current reference number of servers based on current server efficiency estimates and a current number of utilized servers, calculate a growth multiplier based on a ratio of the projected number of users and the count of the current concurrent users, generate a projected number of servers by multiplying the current reference number of servers with the growth multiplier, and display the projected number of servers on the graphical user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows another portion of the embodiment of the graphical user interface shown in FIG. 2.

DETAILED DESCRIPTION

Predictive capacity planning for server-based network computing infrastructure may provide a consistent user experience despite changes in service size, such as when a service grows. In some service scenarios, service usage may be correlated with server utilization. Thus, as more users make increasing demands of the service, the server infrastructure may work harder to support the increasing demand. Further, the demands may not be uniformly distributed across the server infrastructure; some server types may work harder than other server types.

For example, in one scenario, a peak concurrent usage load for an interactive gaming service may be predicted at 1 million users may be predicted for an upcoming holiday weekend, with an estimated 20% of usage will be directed at multimedia download activities, 70% at game play and 10% at social networking. In this scenario, each of these activities may incur a different transaction cost for the gaming service. Transaction costs may be related to server processor utilization at the atomic level, though other transaction costs, such as server memory utilization, server disk speed, and server polling rate may also apply. For example, a multimedia download activity may have a larger transaction cost, and may utilize more server processor time, than a social networking activity. While these example transaction costs may vary according to the activity, there may be a consistent relationship among the various activities. For example, historical data may provide an empirical relationship between multimedia download activity and social networking activity, such that an incremental activity increase in the former often translates to a correlated variation in the latter activity. Thus, an estimating system is provided for calculating capacity for a server array for a projected number of service users based on diagnostic data observed across the service.

Figure 1:
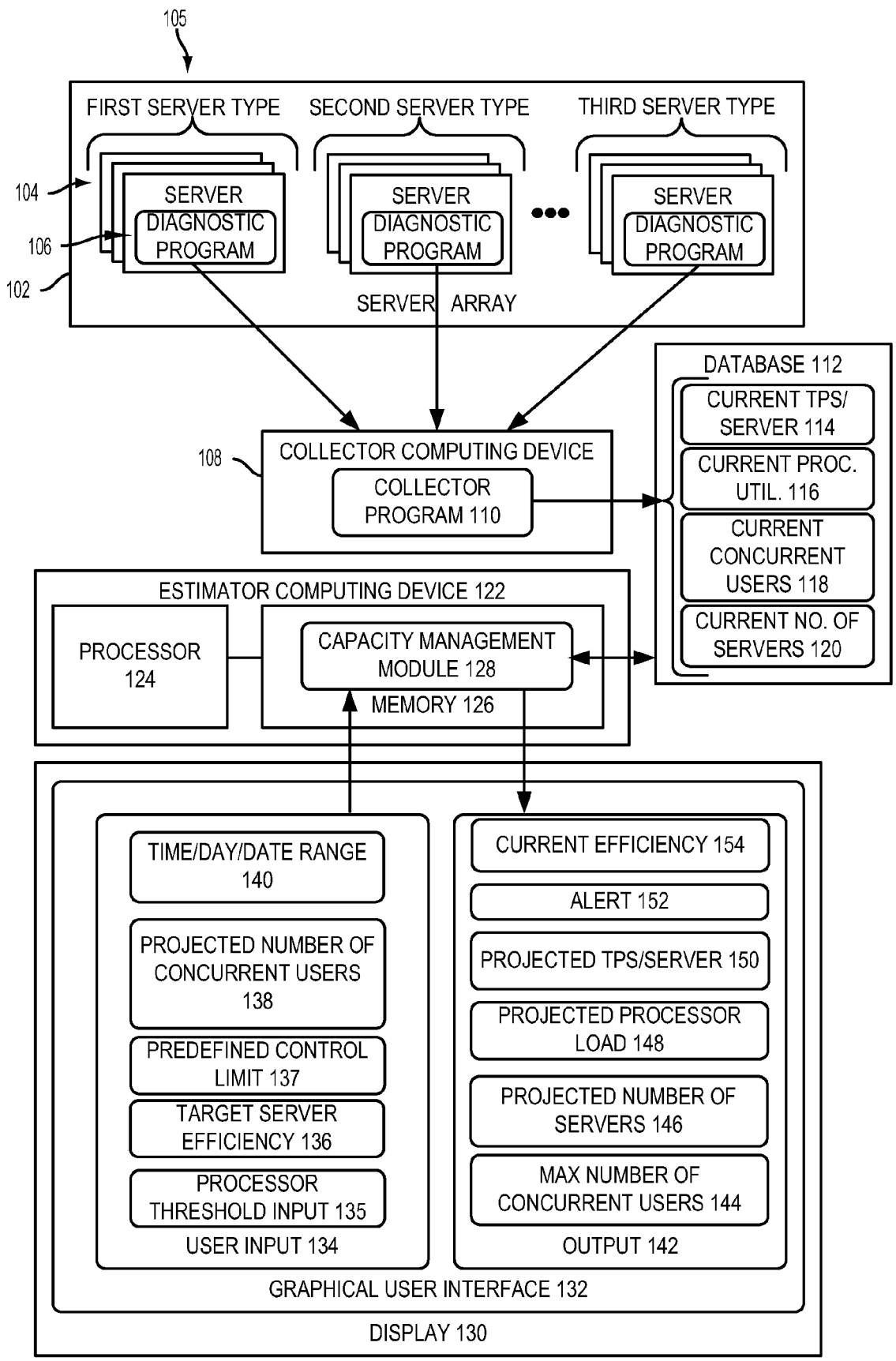
FIG. 1 shows an estimating system for calculating server array capacity according to an embodiment of the present disclosure.

FIG. 1 shows an embodiment of an estimating system 100 for calculating server array capacity. Estimating system 100 comprises a server array 102, a collector computing device 108, an estimator computing device 122, a display 130, and a database 112. In one embodiment, the system may be implemented in a server array at an online gaming service, as will be described in more detail below.

Server array 102 comprises a plurality of servers 104. Servers 104 may be arranged in server array 102 according to a server type 105. For example, an online gaming service may comprise one or more avatar servers for serving user avatars, one or more game servers for serving online games, one or more marketplace servers for serving online retail items, and/or one or more movie servers for serving online movies. Other example server types include, but are not limited to, presence servers, gaming application servers, web service servers, connection servers, security gateway servers, statistics servers, cache servers, and diagnostics servers, to name a few.

Each server 104 includes a diagnostic program 106 for collecting and/or storing various diagnostic data about server use. For example, in some embodiments, diagnostic program 106 may collect data for a count of current concurrent users. In some embodiments, diagnostic data may be detected by one or more work counter modules and/or resource monitoring modules included in diagnostic program 106.

Further, in some embodiments, diagnostic programs 106 may measure server efficiency. For example, diagnostic programs 106 may measure a normalized transaction efficiency or processor efficiency for each server.

Further still, in some embodiments, diagnostic programs 106 may collect current transaction rate data, such as a count of the number of transactions requested per unit time and/or a count of the number of transactions served per unit time, for each server 104.

As shown in FIG. 1, diagnostic data collected from each server 104 is reported to collecting computing device 108.

Collecting computing device 108 includes a collector program 110 for gathering various diagnostic data and storing it in database 112. In some embodiments, collecting computing device 108 may also report diagnostic data, such as a current number of servers 104 of each server type 105 being utilized within server array 102 and a current number of servers 104 allocated to each server type 105, to database 112. For example, the diagnostic data may include a count of 10 servers currently dedicated to an avatar server. Additionally or alternatively, in some embodiments, average current processor maximum load data may be calculated for each server type 105 and included in the diagnostic data stored in database 112.

In the example shown in FIG. 1, database 112 stores, for each server type 105, current transaction rate data, on a per server basis, in the form of a count of the current transactions per unit time, such as current transactions per second (TPS) per server 114, a current processor utilization 116, a count of the number of current concurrent users 118, and a count of the current number of utilized servers 120. Thus, in one scenario, an inspection of database 112 may indicate that, for the avatar server type, each server handles 100 TPS per server; that each avatar server has a 30% processor utilization; that two million concurrent users are currently using the service; and that there are 10 avatar servers. Database 112 may contain similar data for one or more of the other server types as well.

Graphical user interface 132 is presented on display 130. Graphical user interface 132 receives user input 134 and displays output 142. User input 134 is configured to receive one or more parameters on which capacity planning is based. User input 134 may include a projected number of concurrent users 138 and/or a target server efficiency 136.

In some embodiments, user input 134 may include a processor threshold input 135 corresponding to a processor utilization threshold. This may avoid server scaling "hockey-stick" behavior indicative of unpredictable relationships between processor utilization and transaction requests. For example, while servers operating below processor threshold input 135 may exhibit a predictable relationship between transaction rate and a number of users (such as a linear relationship), for many servers, operation above processor threshold input 135 may result in an unpredictable relationship between transaction rate and the number of users, which may adversely affect server performance and server capacity planning.

In some embodiments, processor threshold input 135 may be specified according to server type. For example, a user may specify that a processor for a first server type may have a first processor threshold input of 60% and that a second server type may have a second processor threshold input of 90%. Additionally or alternatively, in some embodiments, user specification of a first processor threshold input for a first type of server may cause a different processor threshold corresponding to a different type of server to be programmatically provided to capacity management module 128. For example, a first processor threshold may be known to have a predictable relationship with a processor threshold for a second server type. Thus, user specification of one of the processor thresholds may cause the other processor threshold to be specified programmatically according to the predictable relationship.

In some embodiments, user input 134 may include one or more specifications that the capacity plan is to be based on diagnostic data collected over a user-specified time/day/date range 140 (e.g., the last 30 days) or a user-specified date range (e.g., from Mar. 1, 2010 to May 1, 2010). Additionally, in some embodiments, the user may specify that the diagnostic data is to be filtered according to a day of the week and/or a time of day key (e.g., use diagnostic data collected in the evenings on weekends or on a particular day, exclude diagnostic data collected during on weekends from 7 PM to 10 PM, select diagnostic data collected during defined holiday periods, etc.) included in time/day/date range 140.

Estimator computing device 122 comprises a capacity management module 128 stored in portions of memory 126 and executed on processor 124. Estimator computing device 122 receives user input 134 from graphical user interface 132 and diagnostic data from database 112, and generates capacity planning information for display at graphical user interface 132.

In response to receiving user input 134, capacity management module 128 computes, for each server type 105, a current reference number of servers based on current server efficiency 154 and the current number of utilized servers 120. In some embodiments, the current reference number of servers may represent a theoretical minimum number of servers 104 able to serve users' demands.

In some embodiments, capacity management module 128 may estimate current server efficiency 154 based on current processor utilization 116 and processor input threshold 135. For example, the current server efficiency may be estimated by dividing current processor utilization 116 by processor threshold input 135. Thus, in one scenario where each of 10 avatar servers has a current processor utilization of 30% and a processor threshold input of 60%, each avatar server would have a current avatar server efficiency of 50%.

In some embodiments, capacity management module 128 may estimate a current server transaction rate per server threshold based on current server efficiency 154 and on current transaction rate data on a per server basis. For example, in some embodiments the current server transaction rate per server threshold may be estimated by dividing the current TPS per server 114 by current server efficiency 154. Thus, continuing the avatar server scenario described above, if each avatar server processes 100 TPS and has a current avatar server efficiency of 50%, the current transaction rate per avatar server threshold would be 200 TPS per avatar server.

The current server transaction rate per server threshold may then be used to compute the current reference number of servers. For example, in one scenario, the current reference number of servers may be calculated by dividing the product of the current number of utilized servers 120 and the current TPS per server 114 by the current server transaction rate per server threshold. Thus, in the avatar server scenario, a current reference number of avatar servers would be five based on the 10 avatar servers current in use, the current 100 TPS per avatar server, and the current transaction rate per avatar server threshold of 200 TPS.

Capacity management module 128 also calculates a growth multiplier based on a ratio of projected number of users 138 and the number of current concurrent users 118. For example, in some embodiments, the growth multiplier may be calculated by dividing the projected number of concurrent users 138 by the number of current concurrent users 118. Thus, continuing with the avatar server scenario, if current count of two million concurrent users is projected to grow to four million concurrent users, the growth multiplier would be 2.

Capacity management module 128 further generates a projected number of servers 144 to be deployed in server array 102 for the projected number of concurrent users 138 by multiplying the current reference number of servers with the growth multiplier. The projected number of servers 146 is then displayed on display 130 via graphical user interface 132. For example, for the avatar scenario described above, the projected number of avatar servers needed to meet projected demand at a 60% processor threshold would be 10 avatar servers. Thus, a user may decide not to purchase additional avatar servers, as 10 avatar servers already are built out.

In some embodiments, capacity management module 128 may estimate a projected server efficiency based on current server efficiency 154 and projected number of servers 144. For example, the projected avatar server efficiency for the scenario described above would be 100%. Additionally, in some embodiments, capacity management module 128 may display an alert 152 via graphical user interface 132 where current server efficiency 154 and/or the projected server efficiency is within or exceeds target server efficiency 136 by a predefined control limit 137.

In some embodiments, capacity management module 128 may calculate a maximum number of concurrent users 144 that can be served for each of the different server types 105 in server array 102 based on processor threshold input 135 included in user input 134, on the projected number of concurrent users 138, and on a growth-modified processor estimation. The growth-modified processor estimation may be generated based on average current processor maximum load data for each server type and on the growth multiplier. The maximum number of concurrent users 144 may then be displayed on display 130 via graphical user interface 132.

Figure 2:
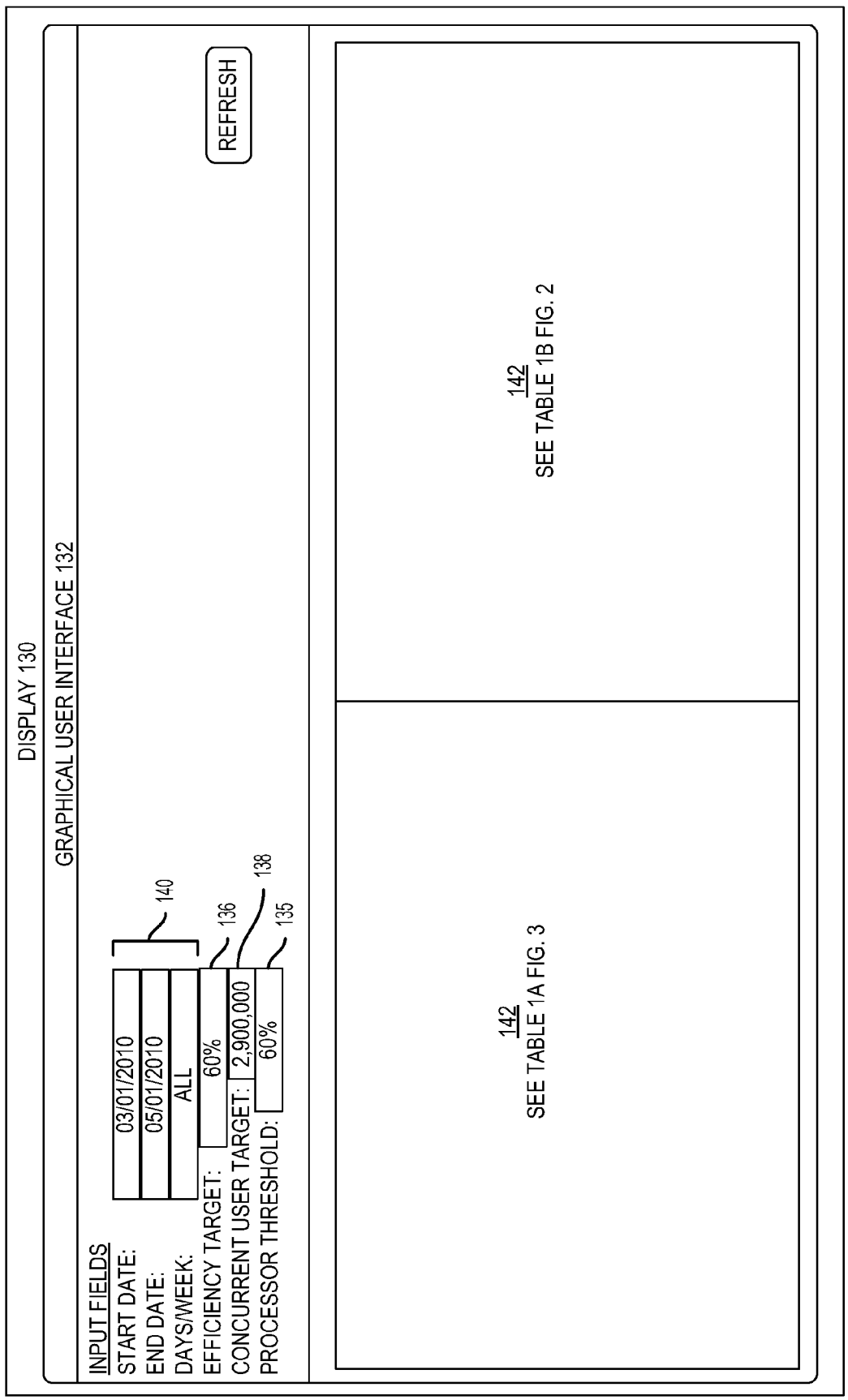
FIG. 2 shows a graphical user interface according to an embodiment of the present disclosure.

An example embodiment of a graphical user interface 132 is shown in FIG. 2. In this example, a user has specified, at time/day/date range 140, that diagnostic data for all days between Mar. 1, 2010 and May 1, 2010 is to be used when projecting the number of servers to be deployed. Further, the user has specified, at target server efficiency 136 and projected number of concurrent users 138 inputs, that server array 102 is to operate at a 60% efficiency level and serve 2.9 million concurrent users at the time for which the number of servers is projected.

Graphical user interface 132 also presents output 142, including a projected number of servers 136, a projected processor load 148, and a projected TPS/server 150. In some embodiments, output 142 may also include a maximum number of concurrent users 144 and/or an alert 152.

Figure 3:
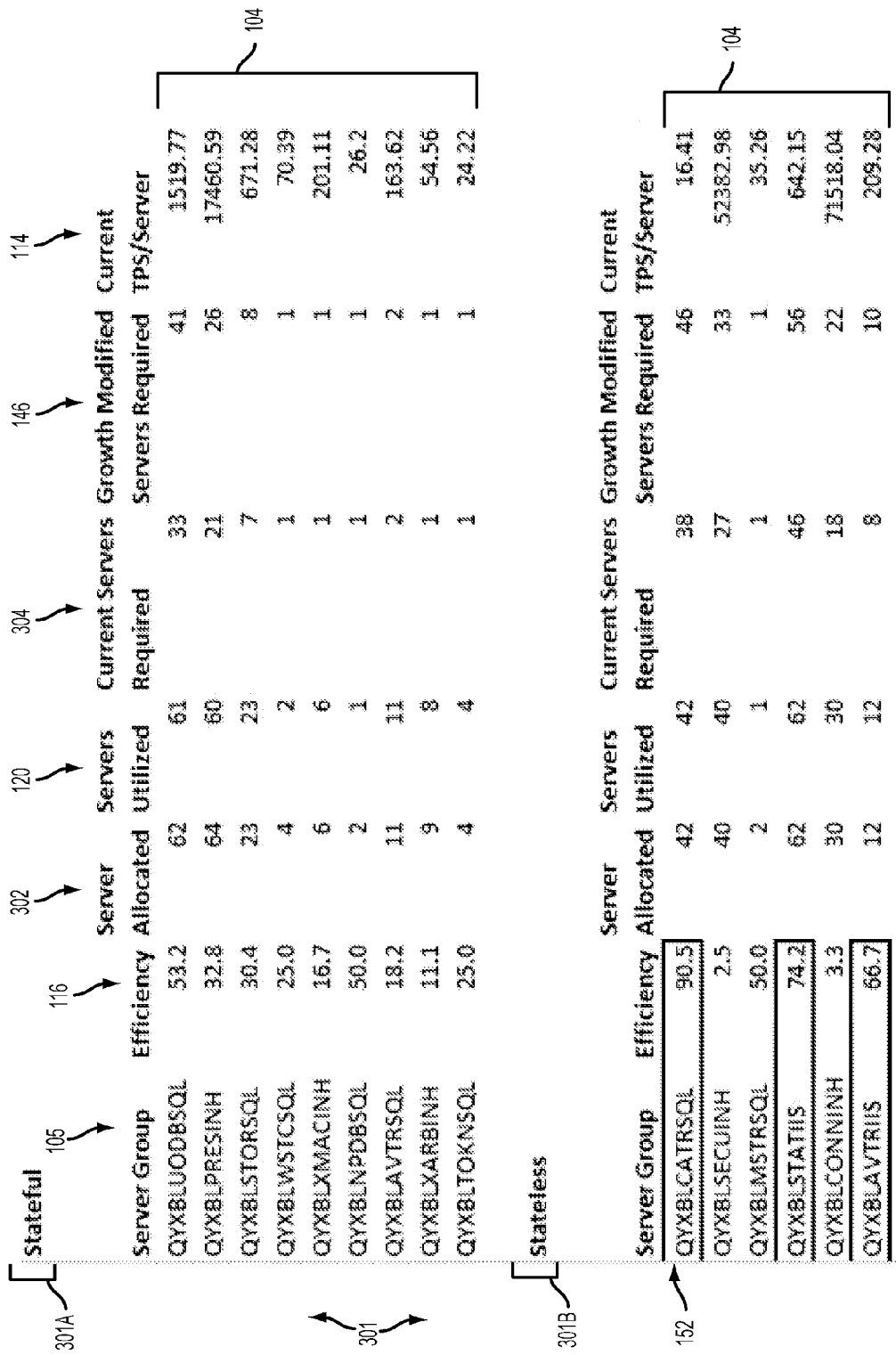
FIG. 3 shows a portion of the embodiment of the graphical user interface shown in FIG. 2.

Example output 142 is presented in Tables 1A and 1B of FIG. 2, and shown in detail in FIGS. 3 and 4, respectively. In some embodiments, output 142 may be presented according to a predetermined priority. For example, FIG. 3 shows a plurality of priority identifiers 301 for identifying a relative priority of servers 104 of one or more server types 105 to a user. In the example show in FIG. 3, a first priority identifier 301A (labeled Stateful) is prioritized over a second priority identifier 301B (labeled Stateless) according to the relative priority of stateful and stateless servers in this example. However, it will be appreciated that, in some embodiments, prioritization may be configured differently or no prioritization may be provided at all. Additionally, in some embodiments, relative prioritization may be user-configurable or may be configured programmatically.

For example, FIG. 3 shows, for each server type 105, output of current server efficiency 154 (labeled Efficiency), a servers allocated count 302 of the current number of servers 104 allocated to each server type 105 (labeled Servers Allocated), a count of servers utilized 120 of the current number of servers 104 utilized (labeled Servers Utilized), a computed current reference number of servers 304 that would serve the current load if the current servers were used to their fullest capacity (labeled Current Servers Required), projected number of servers 146 (labeled Growth Modified Servers Required) to serve projected server load of the projected number of concurrent users 138, and current TPS per server 114 (labeled Current TPS/Server). The server efficiency 154, servers allocated count 302, and server utilized count are determined by diagnostic program 106, as described above.

The current reference number of servers 304 is computed by capacity management module 128, and represents an estimated number of servers it would take to serve the current TPS per server load if each server in the group was used to its fullest capacity. For example, the following equation may be used to calculate the current reference number of servers.

Current Reference Number of Servers="Current TPS per Server"/"TPS Server Threshold"*"Servers Utilized"

The current TPS per server 114 is typically measured by counters configured on each server, which measure requests received per second or other unit time, batch requests per second, etc. The projected number of servers 146 may be calculated by first calculating a growth modified transactions per second as equation, and then multiplying the result by the growth modifier, according to the following equations.

Growth Modified Transactions Per Second="Current TPS/Server"*"Growth Multiplier"

Projected Number of Servers="Current TPS/Server"/ "TPS/Server Threshold"*Servers Utilized Turning now to FIG. 4, Table 1B shows, for each server type 105 in each row of the table, a projected transaction rate per server 148 (labeled Growth Modified TPS/Server), a current transaction rate per server threshold 402 (labeled TPS/Server Threshold), an average current processor maximum load 404 (labeled Current Avg. Max CPU), a projected processor load 148 (labeled Growth Modified CPU), processor threshold input 135 (labeled CPU threshold), and maximum number of concurrent users 144 (labeled Max Supportable CU).

The projected transaction rate per server 148 may be calculated as described above for the Growth Modified Transactions Per Second. The transaction rate per server threshold 402 may be calculated according to the following formula.

Transaction rate per server threshold=("CPU Threshold"/"Avg of Max CPU+1STDEV")*"Current TPS/Server"

where CPU Threshold is a metric identified for the relevant server type, and Current TPS/Server is the average current transactions per second per server as measured by counters deployed for each server of a server type 105.

As used here and elsewhere in this disclosure, an Average Max+1 standard deviation represents an average of maximum values for a metric added to a standard deviation of the samples for the same metric. Thus, as described above, the Average Max CPU usage+one standard deviation represents the average maximum CPU usage+one standard deviation over the observed time period. For example, if five servers have a maximum CPU usage of 50%, 55%, 50%, 50%, and 75%, the average maximum CPU usage for those servers would be 56% and the standard deviation of the maximum CPU usages for those servers would be approximately 10.8%, such that Average Max CPU usage+one standard deviation would be approximately 66.8%. This approach may provide a better utilization metric than alternative approaches, such as setting the utilization to a defined fraction (such as 95% in some examples) of the absolute maximum CPU usage for those servers. For example, for the five servers described above, the absolute maximum is 75%, so that 95% of the absolute maximum is (in this example, 95% of 75% is approximately 71.2%. Thus, it will be appreciated that the 75% value, which may be an outlier, skews the utilization metric less according to the Average Max+one standard deviation approach than according to the defined fraction of the absolute maximum approach. However, it will be appreciated that the Average Max+one standard deviation approach is merely one example approach, and that other suitable examples (including defined fraction of absolute maximum approaches) may be employed within the scope of the present embodiment.

The average current processor maximum load 404 (labeled as Current Avg Max Cpu) may be calculated according to the following equation:

Current Avg Max Cpu="Avg of the max of "Processor, % Processor Time, Total"+1STDEV, which computes an average of the maximum of measured processor usage, processor time, and adds to the selected average one standard deviation of the relevant measurement.

The projected processor load 148 (labeled as growth modified CPU) may be computed as follows.

Growth Modified CPU="Current Avg Max CPU"*"Growth Multiplier", where the Current Avg Max CPU and the growth multiplier are computed as described above.

The processor threshold input 135 (labeled CPU threshold) is typically a value inputted by a user into the processor threshold input field of graphical user interface 132, as shown in FIG. 2, which indicates a desired maximum processor efficiency at which the user desires the servers of a particular server type in the server array to operate. It will be appreciated that the processor threshold input 135 may vary for each server type 105, as for example is illustrated by the differing processor threshold input values in the first and second rows of Table 1B.

The maximum number of concurrent users 144 may be calculated by the capacity management module 128 according to the following equation. This value represents the maximum number of users that the projected number of servers could support, if each server was used to its fullest capacity.

MaxSupportableConcurrentUsers=("Max Concurrent Users in the Period"/"Current Servers Required"*"Servers Utilized".

Figure 5:
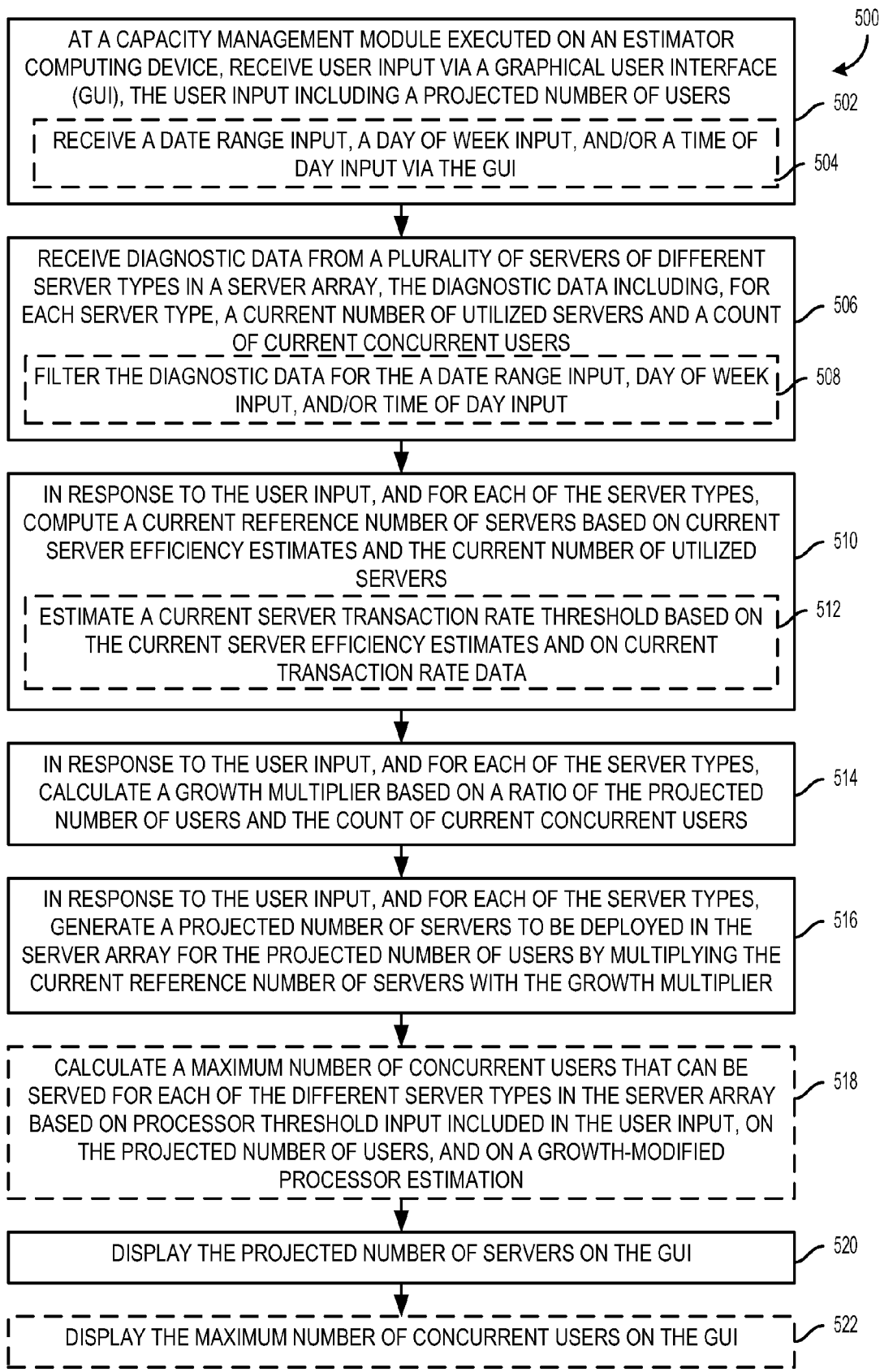
FIG. 5 shows a flow chart for a method according to an embodiment of the present disclosure.

FIG. 5 shows an embodiment of a method 500 for use in calculating server array capacity for an array of servers of different server types. For example, in one scenario, the server types in the server array may include two or more of avatar servers, game servers, marketplace servers, or movie servers. While method 500 is described below with reference to the hardware and software described above, it will be appreciated that method 500 may be implemented with any suitable hardware and software.

Method 500 includes, at 502, at a capacity management module executed on an estimator computing device, receiving user input via a graphical user interface, the user input including a projected number of users.

In some embodiments, receiving user input at 502 may include, at 504, receiving a date range input, a day of week input, a time of day input, a projected number of concurrent users input, a predefined control limit input, a target server efficiency input, and/or a processor threshold input via the graphical user interface.

At 506, method 500 includes receiving diagnostic data from a plurality of servers of different server types in a server array. The diagnostic data may include, for each server type, a current number of utilized servers, a count of current concurrent users and current processor utilization data. For example, in one scenario, the diagnostic data may be detected by work counter modules and/or resource monitoring modules executed on each of the servers in the server array and stored in a database.

In some embodiments, receiving diagnostic data at 506 may include, at 508, filtering the diagnostic data for the date range input, day of week input, and/or time of day input.

At 510, method 500 includes, in response to the user input, and for each of the server types, computing a current reference number of servers based on the current server efficiency estimates and the current number of utilized servers.

In some embodiments, computing a current reference number of servers at 510 may include, at 512, estimating a current server transaction rate threshold based on the current server efficiency estimates and on current transaction rate data. For example, in one scenario, the current transaction rate data may include a count of the number of transactions requested per unit time and/or a count of the number of transactions served per unit time.

At 514, method 500 includes, in response to the user input, and for each of the server types, calculating a growth multiplier based on a ratio of the projected number of users and the count of current concurrent users.

At 516, method 500 includes, in response to the user input, and for each of the server types, generating a projected number of servers to be deployed in the server array for the projected number of users by multiplying the current reference number of servers with the growth multiplier.

In some embodiments, method 500 may include, at 518, calculating a maximum number of concurrent users that can be served for each of the different server types in the server array based on processor threshold input included in the user input, on the projected number of users, and on a growth-modified processor estimation. For example, in one scenario, the growth-modified processor estimation may be generated based on average current processor maximum load data for each server type and based on the growth multiplier, wherein the average current processor maximum load data is included in the diagnostic data.

Continuing, at 520, method 500 includes displaying the projected number of servers on the graphical user interface. In some embodiments, method 500 may include, at 522, displaying the maximum number of concurrent users on the graphical user interface.

The above described systems and methods may be implemented to efficiently manage the capacity planning for a server array, thereby meeting server load expectations while potentially avoiding over- or under-deployment of server resources.

It will be appreciated that the computing devices and servers described herein may be suitable computing devices configured to execute the programs described herein. For example, the computing devices may be mainframe computers, personal computers, laptop computers, portable data assistants (PDAs), computer-enabled wireless telephones, networked computing devices, or other suitable computing devices, and may be connected to each other via computer networks, such as the Internet. These computing devices typically include a processor and associated volatile and non-volatile memory, as well as a mass storage device such as a hard drive. These computing devices are configured to execute programs stored in non-volatile memory using portions of volatile memory and the processor, to achieve the functionality described herein. The computing devices may be configured with user input devices such as keyboards, mice, and touch screens, for example, and further may be equipped with displays.

Further, as used herein, the terms "program" and "module" refer to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above. Computer-readable media may include a memory device such as random-access memory (RAM), read-only memory (ROM), a hard disk, a compact disc (CD), digital video disc (DVD), etc. Some or all of the programs and modules described herein may be software modules or hardware components, such as memory devices.

It may be appreciated that a "service" as used herein, may be an application program executable across multiple user sessions and available to other operating system components and applications. A service may run on a server responsive to a request from a client.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An estimating system for calculating server array capacity, comprising:
   a database for storing diagnostic data detected by work counter modules and resource monitoring modules executed on each server of a server array; and
   an estimator computing device comprising a graphical user interface and a capacity management module executed by a processor using portions of memory and comprising instructions to:
      receive diagnostic data from a plurality of servers of different server types in a server array, the diagnostic data including, for each server type, a current number of utilized servers and a count of current concurrent users, wherein the diagnostic data further includes current processor utilization data, and wherein the diagnostic data is detected by work counter modules and resource monitoring modules executed on each of the servers in the server array and stored in a database;
      receive user input via the graphical user interface, the user input including a projected number of users and a processor threshold input; and
      in response to the user input, and for each of the server types:
         compute an estimated current server efficiency based on the current processor utilization data and the processor threshold input,
         estimate a current server transaction rate threshold based on the estimated current server efficiency and on current server transaction rate data included in the diagnostic data,
         compute a current reference number of servers based on the current number of utilized servers, the current server transaction rate data, and the current server transaction rate threshold,
         calculate a growth multiplier based on a ratio of the projected number of users and the count of the current concurrent users,
         generate a projected number of servers to be deployed in the server array for the projected number of users by multiplying the current reference number of servers with the growth multiplier, and
         display the projected number of servers on the graphical user interface.

2. The system of claim 1, wherein the current server transaction rate data includes a count of the number of transactions requested per unit time and/or a count of the number of transactions served per unit time.

3. The system of claim 1, wherein the server types in the server array include two or more of avatar servers, game servers, marketplace servers, or movie servers or other type of server to client connected array.

4. The system of claim 1, the capacity management module further comprising instructions to, for each of the server types:
   calculate a maximum number of concurrent users that can be served for each of the different server types in the server array based on the processor threshold input included in the user input, on the projected number of users, and on a growth-modified processor estimation; and
   display the maximum number of concurrent users on the graphical user interface.

5. The system of claim 4, wherein the growth-modified processor estimation is generated based on average current processor maximum load data for each server type and the growth multiplier, the average current processor maximum load data included in the diagnostic data.

6. The system of claim 1, the capacity management module further comprising instructions to receive a date range input, a day of week input, and/or a time of day input via the graphical user interface and wherein receiving the diagnostic data includes filtering the diagnostic data for the date range input, day of week input, and/or time of day input.

7. A method for use in calculating server array capacity, comprising, at a capacity management module executed on an estimator computing device:
   receiving diagnostic data from a plurality of servers of different server types in a server array, the diagnostic data including, for each server type, a current number of utilized servers and a count of current concurrent users, wherein the diagnostic data further includes current processor utilization data, and wherein the diagnostic data is detected by work counter modules and resource monitoring modules executed on each of the servers in the server array and stored in a database,
   receiving user input via a graphical user interface, the user input including a projected number of users and a processor threshold input; and
   in response to the user input, and for each of the server types:
      computing an estimated current server efficiency based on the current processor utilization data and the processor threshold input,
      estimating a current server transaction rate threshold based on the estimated current server efficiency and on current server transaction rate data included in the diagnostic data, computing a current reference number of servers based on and the current number of utilized servers, the current server transaction rate data, and the current server transaction rate threshold, calculating a growth multiplier based on a ratio of the projected number of users and the count of current concurrent users, generating a projected number of servers to be deployed in the server array for the projected number of users by multiplying the current reference number of servers with the growth multiplier, and displaying the projected number of servers on the graphical user interface.

8. The method of claim 7, wherein the current transaction rate data includes a count of the number of transactions requested per unit time and/or a count of the number of transactions served per unit time.

9. The method of claim 7, further comprising, for each of the server types:

calculating a maximum number of concurrent users that can be served for each of the different server types in the server array based on the processor threshold input included in the user input, on the projected number of users, and on a growth-modified processor estimation; and displaying the maximum number of concurrent users on the graphical user interface.

10. The method of claim 9, wherein the growth-modified processor estimation is generated based on average current processor maximum load data for each server type and the growth multiplier, the average current processor maximum load data included in the diagnostic data.

11. The method of claim 7, further comprising receiving a date range input, a day of week input, and/or a time of day input via the graphical user interface and wherein receiving the diagnostic data includes filtering the diagnostic data for the date range input, day of week input, and/or time of day input.

12. The method of claim 7, wherein the server types in the server array include two or more of avatar servers, game servers, marketplace servers, or movie servers.

13. A method for use in calculating server array capacity, comprising, at an estimator program executed on an estimator computing device:

receiving diagnostic data from a plurality of servers of different server types in a server array, the server types including two or more of avatar servers, game servers, marketplace servers, or movie servers, the diagnostic data including, for each server type, a current number of utilized servers and a count of current concurrent users, wherein the diagnostic data further includes current processor utilization data, and wherein the diagnostic data is detected by work counter modules and resource monitoring modules executed on each of the servers in the server array and stored in a database, receiving user input via a graphical user interface, the user input including a projected number of users and a processor threshold input; and in response to the user input, and for each of the server types:

computing an estimated current server efficiency based on the current processor utilization data and the processor threshold input, estimating a current server transaction rate threshold based on the estimated current server efficiency and on current server transaction rate data included in the diagnostic data, computing a current reference number of servers based on the current number of utilized servers, the current server transaction rate data, and the current server transaction rate threshold, calculating a growth multiplier based on a ratio of the projected number of users and the count of current concurrent users, generating a projected number of servers to be deployed in the server array for the projected number of users by multiplying the current reference number of servers with the growth multiplier, calculating a maximum number of concurrent users that can be served for each of the different server types in the server array based on the processor threshold input included in the user input, on the projected number of users, and on a growth-modified processor estimation, and displaying the projected number of servers and the maximum number of concurrent users on the graphical user interface.

14. The method of claim 13, wherein the current server transaction rate data includes a count of the number of transactions requested per unit time and/or a count of the number of transactions served per unit time.

15. The method of claim 13, further comprising receiving a date range input, a day of week input, and/or a time of day input via the graphical user interface and wherein receiving the diagnostic data includes filtering the diagnostic data for the date range input, day of week input, and/or time of day input.

* * * * *